June 2, 1970     J. H. DOLL ET AL     3,515,596
METHOD FOR APPLYING SPACING MEANS BETWEEN ELECTRODES
OF ELECTRIC POWER SOURCES
Filed March 22, 1966     4 Sheets-Sheet 1
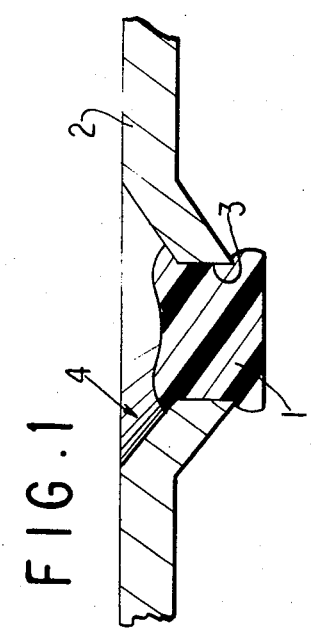
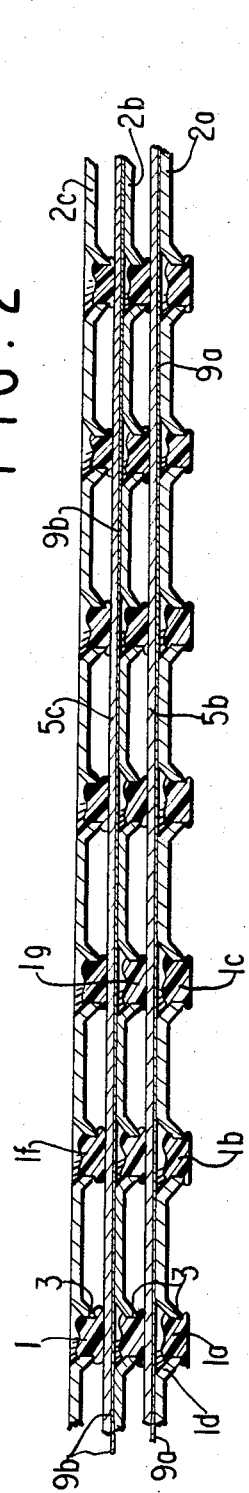
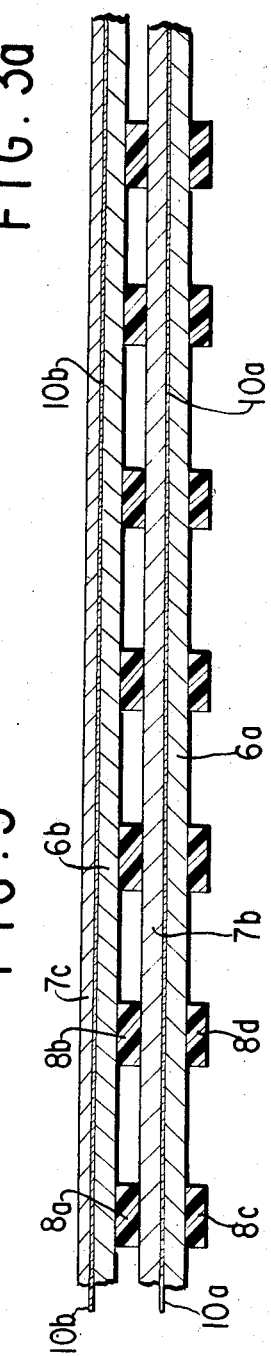
INVENTORS
JEAN HENRI DOLL
HENRI DESIRE' DRUESNE
BY
Kenyon & Kenyon
ATTORNEYS June 2, 1970  J. H. DOLL ET AL  3,515,596
METHOD FOR APPLYING SPACING MEANS BETWEEN ELECTRODES
OF ELECTRIC POWER SOURCES
Filed March 22, 1966  4 Sheets-Sheet 2
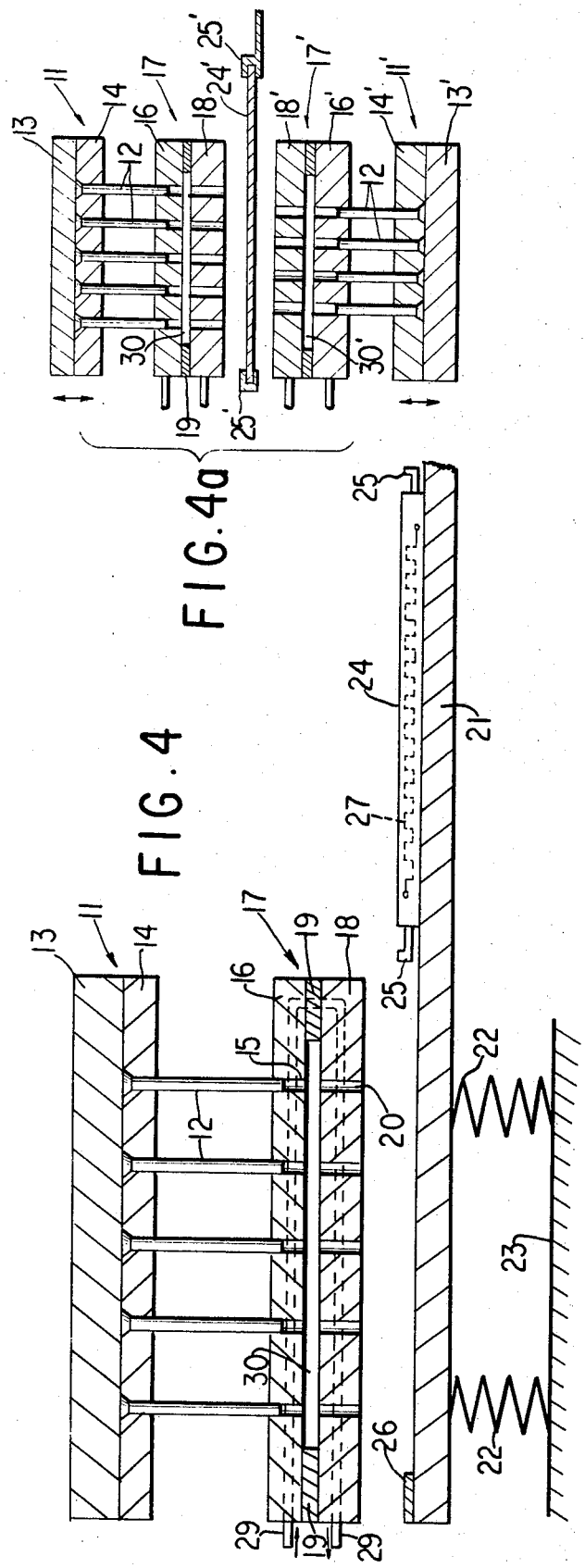
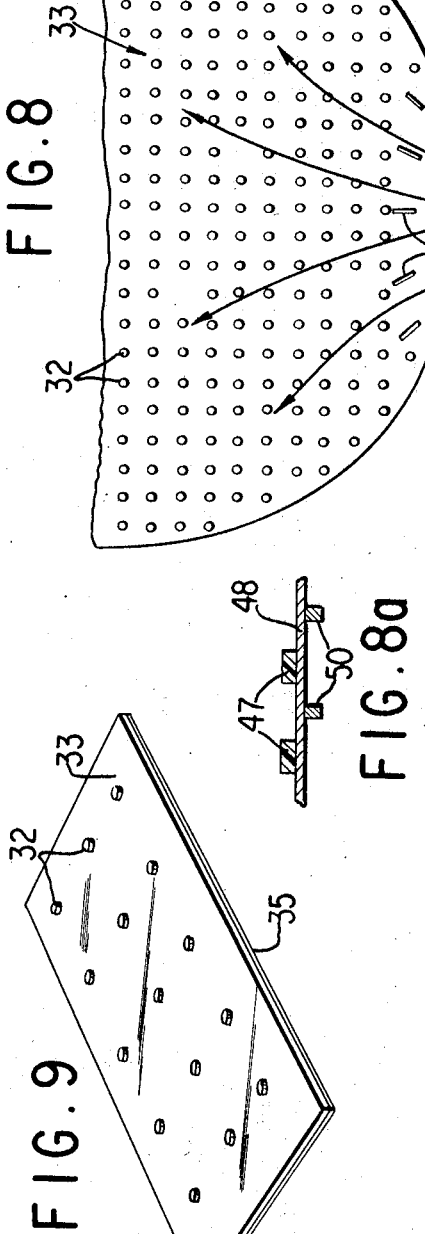
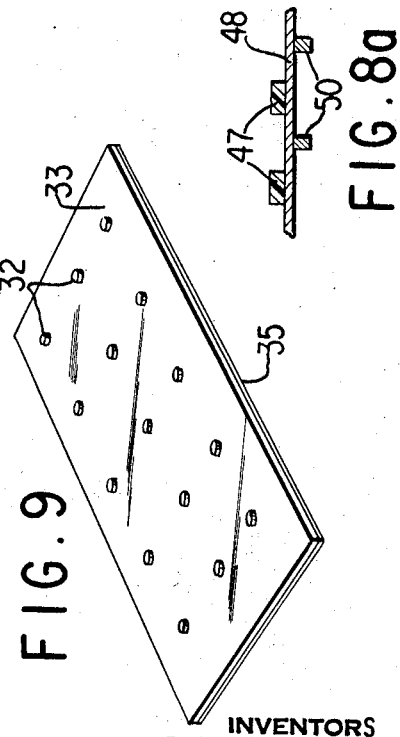
INVENTORS
JEAN HENRY DOLL
HENRI DESIRE DRUESNE
BY
ATTORNEYS

INVENTORS
JEAN HENRY DOLL
HENRI DESIRE DRUESNE
BY
ATTORNEYS

June 2, 1970   J. H. DOLL ET AL   3,515,596
METHOD FOR APPLYING SPACING MEANS BETWEEN ELECTRODES
OF ELECTRIC POWER SOURCES
Filed March 22, 1966   4 Sheets-Sheet 4
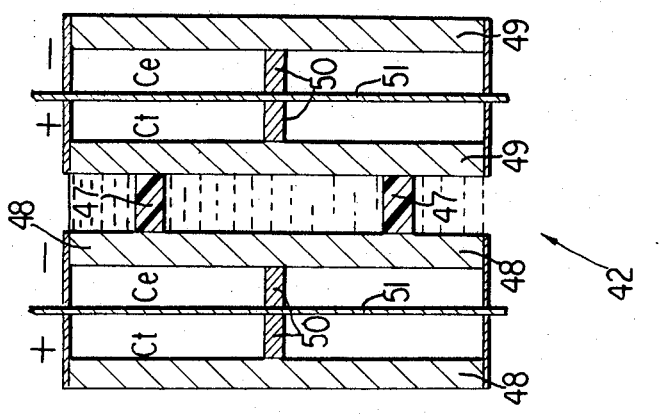
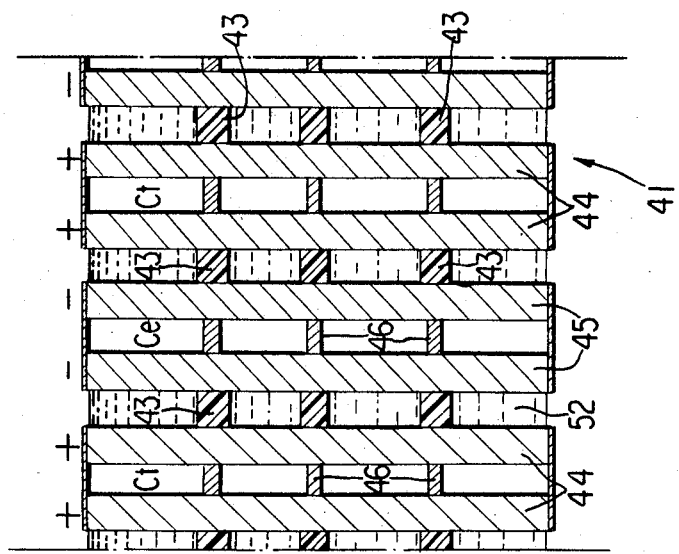
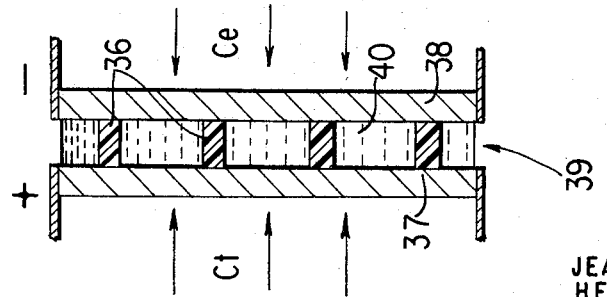
INVENTORS
JEAN HENRI DOLL
HENRI DESIRE DRUESNE
BY
ATTORNEYS – # United States Patent Office 3,515,596
Patented June 2, 1970

3,515,596
METHOD FOR APPLYING SPACING MEANS BETWEEN ELECTRODES OF ELECTRIC POWER SOURCES
Jean Henri Doll, Aulnay-sous-Bois, and Henri Désiré Druesne, La Courneuve, France, assignors to Societe des Accumulaterurs Fixes et de Traction (Societe Anonyme), Romainville, France, a French company
Filed Mar. 22, 1966, Ser. No. 536,395
Claims priority, application France, July 29, 1965, 26,581
Int. Cl. H01m 31/00, 33/00
U.S. Cl. 136—175                  9 Claims

ABSTRACT OF THE DISCLOSURE

A method for effecting substantially uniform spacing between plates of cells of a battery comprising the steps of severing individual spacer elements from a spacing sheet, directly adhering the severed elements to an electrode sheet and stacking said sheets with additional electrode sheets, the spacer elements serving to provide the substantially uniform spacing.

---

This invention relates to apparatus and method for applying spacing means between electrodes of electric power sources such as deferred action sea-water cells or batteries and fuel cells and to their resultant products.

In primary or secondary electrical batteries and more particularly, in deferred action sea-water batteries comprising, for example, silver chloride-magnesium or cuprous chloride-magnesium couples, the separator means positioned between the positive and negative electrodes of each cell must space and insulate the cathode from the anode of each cell, and at the same time allow for a rapid and sufficient flow of electrolyte therebetween, in order to make possible the evacuation of electrochemical and side reaction products (e.g., insoluble magnesium hydroxide in the above-described batteries).

These conditions are ordinarily well filled by the use of quasi-punctual separators comprising a plurality of small glass beads embedded on one side of each positive electrode and having an excellent mechanical resistance to pressure.

Such a battery is comprised of a stack of series-connected cells which must form a compact and strong unit. Therefore, the separator must have a sufficient resistance to compression. Good compactness of the batteries is usually maintained by means of an epoxy resin inserted on and between the peripheral rims of the cells.

However, many problems are created by the use of glass bead separators and their solutions are difficult and expensive. Among these problems:

The tools required for embedding glass beads in the positive electrodes can only be used with one size of very uniform beads and must be changed if other size beads are to be used.

The distance between electrodes is determined by the size of the bead but allowance must be made for the necessity of embedding the beads in the electrodes.

As a consequence, for each thickness of the silver chloride electrode determined by the electric specifications of the desired battery, there is only one possible diameter for the appropriate beads. The distance between the electrodes of a cell, however, is not determined by the electric specifications, but by the necessity of evacuating the insoluble magnesium hydroxide created during its use. Thus, in order to assemble a short operational life battery, thin sheets of silver chloride about 0.1 mm., for instance, could be used, but as the distance between electrodes is required to be approximately always the same, about 0.5 mm., for example, it is impossible to embed 0.5–0.6 mm. diameter glass beads in it. Moreover, for a battery of this type to be mounted in a torpedo, sea-water must be able to flow very quickly between the positive and the negative electrodes of each cell, hence the glass beads must be deeply inlaid in the silver chloride sheet.

With cuprous chloride instead of silver chloride electrodes, the above-described problems are much more complicated and in reality without solution, because cuprous chloride is not maleable enough to retain the glass beads.

It is one object of the present invention to solve the above-described problems and difficulties.

It is possible to find other attempted solutions described in the relevant literature:

One proposed solution is the incrustation in the two electrodes simultaneously of hard insulating bits, and then pressing one electrode on the other after incrustation with said bits. In another proposed way, drops of glue or adhesive are sprayed at random on the surface of an electrode and as a result, a number of insulating bits falling on the electrode are adhered to it. This method is rather easy to carry out, but it gives indifferent results in electrical generators of the character in question.

In another attempted solution, it has been proposed to apply an insulating plastic composition in liquid form to the surface of the electrode, and to cause said plastic to set and to adhere to the electrode. In still another embodiment that has been proposed, the electrode is first embossed to form spaced protrusions, the tips of which are then covered with said liquid plastic composition.

In still another proposed solution, the electrodes have a number of holes drilled therethrough into which polyethylene beads are inserted.

None of these processes or suggestions has yielded any interesting industrial results because of the difficulties encountered in their realization.

It is to be noted that in the literature the desired separators are described with much more accuracy than the manner of their practical realization because all the difficulties of the problems are precisely located in these manners of realization.

A suitable means for spacing cell electrodes embodying this invention, particularly for a deferred action sea-water battery is noteworthy in that one face of each electrode of a given polarity is covered with an insulating sheet, which is stamped by a cutting tool such as a die-plate laid over said electrode. The parts cut off in the insulating sheet are automatically fastened to said electrode and protrude from one side. The remainder of the insulating sheet is then stripped from the electrode.

It is a further object and feature of this invention to fasten or secure said deposited insulating parts to the electrode by gluing or welding or otherwise.

One way in which the stamped-out insulating parts may be secured to the electrodes is that said insulating parts may, during their stamping out, be pushed down or pressed into holes perforated beforehand in said electrode. They are then disposed during stamping out and pressing in such a way that they protrude from the electrode on the opposite side to that from which they have been pressed into it.

It can be seen, therefore, that with this embodiment of the process of the present invention, it is possible to secure insulating parts to electrodes as by gluing, adhering, welding, soldering or by insertion into holes in the electrodes. Obviously, any distribution of said insulating parts on the electrode surface can be chosen.

Said insulating parts, once fastened to the electrodes can be rolled, calendered or compresed after warming so that all have the same height above the electrode surfaces and can eventually be hardened or set if they are comprised of thermosetting plastics or of asbestos or paper impregnated with such plastics.

In a preferred embodiment, the insulating parts are fastened to the negative electrode which is, for example, made of magnesium.

This form of invention is primarily concerned with primary or secondary batteries or cells, particularly of the deferred action sea-water type, batteries of this type comprising at least one cell having a positive electrode of a silver chloride or cuprous chloride sheet, for example, and a negative electrode of a magnesium sheet, for example, said electrodes facing each other and being spaced from each other by the stamped-out insulating parts made of thermoplastic resin, of thermosetting resin, or of a thermoplastic or thermosetting resin-impregnated porous carriers such as asbestos, paper, said parts being cut off or stamped out of a sheet of such materials and being secured to at least one electrode.

The fastening of the spacer parts on electrodes of one polarity or on both electrodes at the same time is performed, for instance, as by gluing, welding as by heating, or by means of an adhesive, or by driving said spacer parts with pressure into appropriate holes in an electrode. With the latter process, the insulating spacer parts driven into one face of the electrode protrude from its other face and afterwards they lie in contact with the second electrode of the cell.

The above-described process for realizing separators is particularly suitable for deferred action sea-water batteries. This process has been further improved and with such further improvement or embodiments, it is now possible to apply such improved process to solve much more difficult problems particularly relating to electrode spacing for fuel cells. Said further improvements and solutions are further objects and features of the present invention.

In such further improvements, the spacer can be cut off from an insulating or conductive sheet as desired and the stamped-out or cut-off insulating or conductive spacer parts are then pushed and deposited onto at least one face of each electrode of one polarity. That is to say, the spacer parts are cut or stamped out beforehand in an insulating or conductive sheet, for instance, as by drivers or punches, and a cutting tool in the form of a perforated die plate which is positioned between the drivers and the electrode. Said spacing parts are secured to the electrode as by gluing, welding, adhesion, insertion and stamping onto or into holes in said electrode. The sheet from which the spacing parts are cut can be of an insulating material when said parts are to be positioned between electrodes of different polarity and can be of a conducting material when said parts are positioned so as to connect two electrodes electrically.

It is a further object and feature of the present invention to choose the shape, the location, the distribution and the number of drivers, and of the corresponding holes of the die plate in relation to the shape, the distribution in quality and the quantity of the spacer parts. These components are chosen in order to provide a good flow of electrolyte and of fuel, particularly in relation to the gas diffusion and good electrical conductivity, mechanical strength, etc.

Other objects and features of the invention are the provision of a device, apparatus or machine which makes the spacer part, said machine using known tools, the arrangement of which is another object and feature of the present invention.

Said tools are:

A number of drivers or rivet-like punches or the like, are secured to a supporting plate and operate in collaboration with a die plate, said die plate having holes, the shape and the number of which are the same as the drivers, said die plate comprising two parallel perforated plates spaced from one another by means which allows therebetween a receiving space for the insulating or conducting sheet that is to be cut into desired spacer parts to be deposited on the electrode. That one of the perforated plates which is the furthest from the electrode serves as a guide for the drivers, and the other perforated plate which lies just above the electrode is a tool which cuts the spacer parts from the sheet and then guides the said parts cut from the sheet and then guides the said parts cut from the sheet to the electrode for deposition on or insertion into the latter.

As it will be seen clearly hereafter, with such an apparatus or machine, it is possible to provide spacer means that quickly, easily and economically space the electrodes of electrical power sources of the type described, providing at the same time very good operating characteristics to the said power sources.

Further objects and features of the present invention are the provision of primary or secondary batteries or cells produced by the above-described improved process and/or with the above-described machine, said batteries or cells being particularly of the deferred action sea-water or fuel cell types, said batteries being particularly remarkable in that each cell is composed of at least one positive electrode (e.g., of silver chloride, cuprous chloride, or a porous carrier with catalysts on or in it) and of one negative electrode (e.g. of magnesium, or a similar porous carrier) facing and being spaced from one another either by insulating spacer parts comprising thermoplastic or thermosetting resins, or porous carriers (e.g. asbestos, cardboard, paper) impregnated with such resins, said insulating spacer parts having been severed from a sheet and secured to at least one of the electrodes.

In such batteries, two adjacent electrodes of adjacent cells belonging to different ones of such cells, may be series-connected as by a sheet of silver, for example, which serves at the same time as a partition to prevent intermingling of electrolyte between the cells of the deferred action sea-water batteries, but they also can be series-connected by conductive spacer parts secured to at least one electrode having a metal partition attached thereto.

Other objects and features of this invention will become apparent from the following description when considered in conjunction with the accompanying drawings forming a part hereof and wherein:

FIG. 1 is a fragmentary enlarged sectional view of an electrode showing a manner of securing the insulating spacer parts to the electrode;

FIG. 2 shows a stack of electrodes spaced with the separator spacer parts in accord with FIG. 1 of the present invention;

FIG. 3 shows another embodiment of the combined electrode-separator of the present invention;

FIG. 3a shows a further sectional embodiment of an electrode-separator embodying the invention;

FIG. 4 is a diagrammatical partly sectional view showing details of the main tools of a machine embodying the invention, in their initial positions;

FIG. 4a shows a modified form of machine;

FIG. 8 is a plan view of an electrode provided with the spacer parts as embodied in this invention;

FIG. 8a is a fragmentary sectional view of another embodiment of such electrode;

FIG. 9 is a perspective view on an enlarged scale of a portion of the electrode of FIG. 8;

FIG. 10 is a sectional view of a fuel cell embodying the present invention;

FIG. 11 is a sectional view of a stack of parallel connected battery of fuel cells using the spacer parts of this invention, and FIG. 12 is a view similar to FIG. 11, but shows a stack of series-connected fuel cells embodying the invention.

Figure 5:
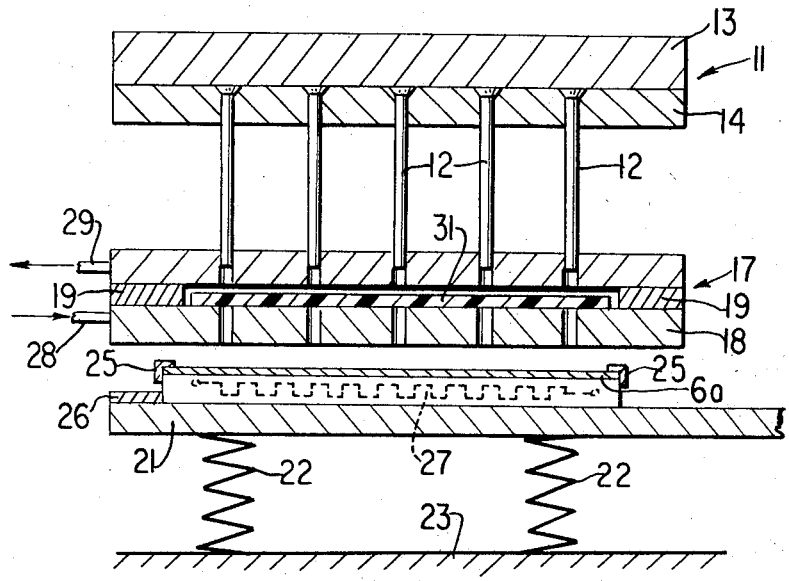
FIGS. 5, 6 and 7 are views similar to FIG. 4 of the machine of FIG. 4 in successive stages of its operation.

Referring now to the drawings and first to FIGS. 1 and 2, the insulating spacer parts 1, 1a, 1b, 1c, 1f, 1g, 1h of FIG. 2 are substantially cylindrical in section. They are driven through the holes of the negative electrode 2, 2a, 2b and 2c (of magnesium, for example). The three negative electrodes 2a, 2b, 2c are shown on FIG. 2. The holes 3 provided in said electrodes into which the separating spacer parts 1, 1a, 1b, 1c, 1f, 1g, 1h, as the case may be, are to be inserted, may be made beforehand, for example, by a stamping or perforating press (not shown). The electrode plates 2, 2a, 2b and 2c may be, for example, a 0.4 mm. thick magnesium sheet of desired configuration and holes 3 may be 1 mm. in diameter. In stamping out the holes 3, the plates 2, 2a, 2b, and 2c in the regions adjacent the holes 3 assume the flared sectional shape shown in FIG. 1.

In an alternative embodiment, these holes 3 can be made by the same tool which inserts the insulating parts 1, 1a, 1b, 1c, 1f, 1g and 1h into said electrodes 2, 2a, 2b and 2c.

In still a further alternative embodiment, the said insulating parts are cut from the sheet of insulating material and then pushed into the flared mouths 4 of the holes 3 so that they protrude from the under side of the sheets 2, 2a, 2b and 2c as shown in FIGS. 1 and 2. They may then be riveted in place. The cells of the battery are series-connected so that the negative electrode 2a of one cell is in electrical contact with the positive electrode 5b of the next adjacent cell. Generally, a thin conductive sheet 9a, for example, of silver is placed therebetween electrodes 2a and 5b to prevent the electrolyte from flowing between said two electrodes which belong to different adjacent cells, particularly when the electrodes are perforated by holes 3. Similarly, a conductive sheet 9b of the same material as sheet 9a is placed between electrodes 2b and 5c. Thus, the superposed cells are series-connected, but are separated from each other by respective conductive sheets 9a and 9b, the said sheets 9a and 9b being at the same time the current collectors.

Actually, a great number of flared holes 3 are provided in the electrodes 2, 2a, 2b and 2c, for example, one hole for each 5 to 10 mm. of electrode area in aligned or in staggered relationship.

The thickness of the insulating spacer parts 1, 1a, 1b, 1c, 1f, 1g and 1h, that is to say, the thickness of the insulating sheet from which they have been cut is selected, depending on the flared form of the sheet 2 in order to provide proper spacing between the electrodes of each cell.

The insulating materials from which said spacer parts are cut must have suitable mechanical properties, particularly with respect to their resistance to crushing, their elastic limits and their resistance to heat. Many materials may be suitable, for instance, thermoplastic resins such as polystyrene or thermosetting resins impregnating a porous carrier such as paper, asbestos, etc., or similar insulating material. The polymerization of thermosetting resins may be effected when needed, either before, or after fastening the insulating spacer parts to the electrodes. Then calendering of the combined electrode and spacer parts may be advantageous in providing uniform spacer depths or else in hardening the thermosetting resins if used for the spacer parts.

FIG. 3 shows one preferred embodiment of the present invention. Therein, the negative electrodes 6a and 6b (for example, of magnesium) and the positive electrodes 7b and 7c (for example, of silver chloride), of a pair of adjacent cells respectively are spaced and insulated from each other in each cell such as that comprised by electrodes 6b, 7b of the stacked cells by the respective spacer parts 8a, 8b, 8c, 8d, etc. Two adjacent plates 6a and 7b, 6b and 7c belonging to different adjacent cells are separated as by thin metallic sheets 10a and 10b, e.g., of silver.

The insulating spacer parts 8a, 8b, 8c, 8d are secured to the respective electrodes 6a, 6b, by gluing, welding, etc., They can be cut from a sheet of plastic material which will stick to the respective electrodes, for instance, by heating, which fuses said material thereto or by an adhesive applied to the said material. The insulating sheet and the adhesive may be comprised of inert materials. It may be fiberglass, cardboard, paper impregnated with a resin that will be set chemically or be thermoset by heating.

Said insulating sheet is placed on a special tool (a die press, for instance, as will be described) so that insulating spacer parts can be cut therefrom and then pushed directly onto the surface of an electrode which is positioned under the tool to receive them and which may be heated In assembling the batteries of FIGS. 2 or 3, the insulating parts 1, 1a, etc., or 8a, 8b, etc., are fastened to one electrode e.g., electrodes 2a, 2b, 2c or 6a or 6b and in the stack of electrodes forming cells, they are simply laid against the adjacent positive electrode 5b, 5c and 7b, 7c of the respective cells. Obviously, however, they can be secured at the same time to the surface of both such electrodes.

A suitable machine for cutting spacer parts like 8a, 8b, 8c, 8d from an insulating sheet and depositing them on an appropriate electrode, such as 6a or 6b and the sequential steps in its operation is illustrated in diagrammatic section in FIGS. 4 to 7 inclusive.

According to the embodiment shown in FIGS. 4 to 7, a machine intended for embodying the spacer part forming and applying the process of the present invention comprises a driver or rivet-like punch carrying element 11, said drivers or punches being designated 12. The element 11 is advantageously composed of a backing plate 13 and of a carrying plate 14 in which said drivers 12 are mounted for vertically reciprocal movement.

The lowest ends of the drivers or rivet punches 12 are always engaged in aligned holes 15 of a plate 16 which latter serves as the guide element of the die component 17, the second plate part 18 of which acts as a cutting tool and which is spaced from plate 16 as by spacing members 19. The holes 15 and 20 of the respective plates 16 and 18 are, of course, in alignment with the drivers or punches 12. Below the die plate 18 a stage plate 21 is located, being mounted on spring-like absorbers 22 soldered or otherwise secured to a fixed base 23.

A laterally, reciprocally movable slide 24 with side jaws 25 which latter serve to fix an electrode, e.g., an electrode 6a, 6b or others to which spacer parts are to be applied is slidable on the surface of the stage plate 21 as shown in FIGS. 4 to 7. A suitable stop member 26 is located on the stage plate 21 to stop the slide 24 in appropriate position under die component 17. Means of heating such as an electrical resistance heating coil 27 may be mounted in the slide 24. This resistance 27 could, of course, be replaced by another type heating means, for instance, with a steam coil (not shown). The plates 16 and 18 may be hollow so that cooling means, for instance, water, may be circulated through them as desired, entering through a pipe 28 and exiting through another pipe 29. The water can be admitted as desired to cool the die plates 17 and 18 when needed.

Between the die plates 16 and 18, the spacer members 19 provide a space or chamber 30 into which a sheet 31 of the desired spacing material from which the spacer parts are to be cut can be inserted. The thickness of the sheet 31, is, of course, chosen according to the desired spacing distance required between the electrodes of the cells and batteries to be manufactured.

Figure 6:
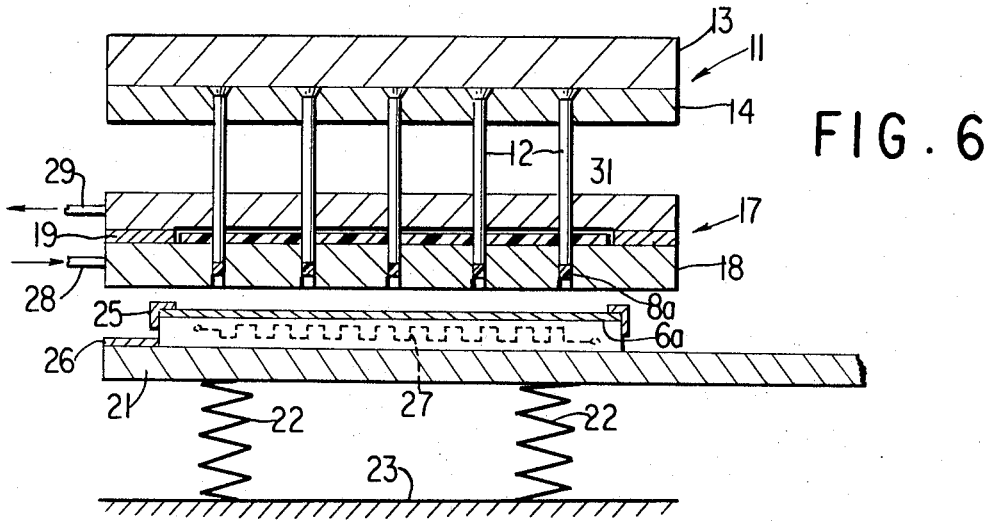
Figure 7:
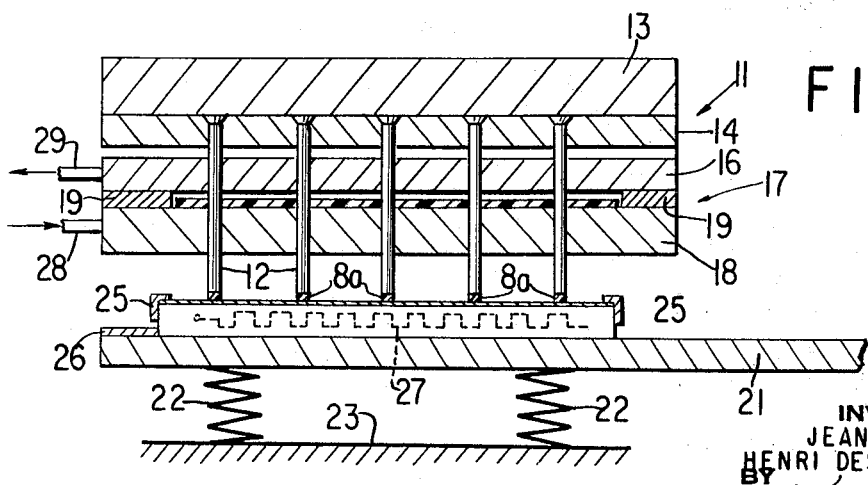

The operations of the machine are readily apparent from FIGS. 4 to 7. The machine being at the outset in the state shown in FIG. 4, an electrode plate 6a or the like, is placed on the slide 24 and the jaws 25 serve to lock themselves on the electrode plate rims when the slide 24 is moved against the stop 26 locking the electrode plate 6a, 6b, as the case may be, in position under the die plate 18 A spacing sheet 31 is then inserted into the chamber 30 Then driver plate 11 is moved down and the drivers 12 cut said sheet 31 as shown in FIG. 6 into separate spacer parts 8a or the like which are guided in the holes 20 of the plate 18. The drivers or rivet punches 12 are guided in their cutting operation by the guide plate 16 and by the die plate 18. All the cut spacer parts 8a or the like are pushed downwardly as shown in FIG. 7 onto the upper surface of electrode plate 6a or the like and the adjusted biasing action of the spring means 22 provides a suitable pressure to secure the parts 8a on the electrode 6a or the like.

The distribution, the shape, the size and the number of the spacer parts 8a or the like are chosen in relation with the electrolyte flow, the diffusion of gas, the electric conductivity, the mechanical strength, etc., which are desired for the battery to be formed.

In FIG. 8, an embodiment is shown in which the severed pellet-like spacer parts 32 are cylindrical in Lshape, the depth of each of which is the thickness of the sheet 31 from which they have been cut or punched. This FIG. 8 shows a sea-water battery negative electrode 33, the location thereon and the shape of the spacer parts 32 being chosen in order to facilitate electrolyte flow as indicated by the arrows; that is to say, in order to insure a good distribution of electrolyte all over the active surface of the electrode 33. For some purposes, some of the spacer parts 34 may have another shape as can be seen in FIG. 8. The latter are intended to deflect the electrolyte as it enters between electrodes so as to provide a good distribution of electrolyte all over the active surface of the said electrodes. These spacer parts 34 also may be cut off from the same sheet 31 as the parts 32, it being merely necessary to modify the sections of some of drivers 12 and holes 15 and 20 in which they operate so that spacer parts 34 rather than parts 32 will be cut and deposited on the electrode.

In the case of FIG. 8, the spacer parts 32 and 34 are advantageously cut from or punched out from a plastic material sheet 31 coated beforehand on at least one face, with an adhesive product which will stick to the electrode by use of heat. Said adhesive product must be chosen to withstand the operating conditions of the desired power source, that is to say, the internal temperature, the electrolyte, etc. For this purpose, the adhesive is advantageously of a polymerizable type. It is possible to secure the spacer parts 32 and 34 firmly on the electrode 33 merely by heating the latter as by coil 27 and maintaining the drivers or punches 12 in the position shown in FIG. 7 for a suitable time, that is sufficient, for example, to the fuse and polymerize the adhesive product on the electrode surface on which said parts 32 and 34 have been deposited. Said adhesive product advantageously is in the form of a tape, one face of which is adhered to the sheet 31 with non-polymerizing heat, pressure, etc., and the second face of which is normally protected by suitable cover sheet such as paper which is stripped therefrom just before its insertion into the machine space 30.

As a non-limitative example:

The spacer parts 32 are: cylindrical in shape, 1.1 mm. in diameter, 1 mm. thick and are distributed on the surface of electrode 33 four per square centimeter and are made of polypropylene.

The adhesive product constitutes a tape available commercially as "Scotch-weld" No. 583, one face of which is protected by a cover sheet of strippable paper. The other face of this tape is adhered to one face of the polypropylene sheet 31 prior to its insertion into the die space 30 by pressure and heat which latter is insufficient to polymerize the adhesive tape. The protective paper cover sheet is stripped from the tape just prior to insertion of sheet 31 into die space 30, so that the exposed surface of the tape faces die holes 20. Then, as the drivers 12 cut the parts 32 as described and deposit and press them onto the electrode 33, the heating of the latter effected by coil 27 is effective to adhere parts 32 to said electrode and is sufficient to polymerize the adhesive of the tape so that said spacer parts 32 are strongly secured to said electrode and resistant to the chemical action of sea-water or even of concentrated alkaline electrolyte solutions.

It is apparent that any suitable means can be used with the machine shown in FIGS. 5 to 7 to secure spacer parts to an electrode, among these are: gluing, welding, sticking by application of heat, or direct insertion of the cut spacer parts 32 by the drivers 12 into holes made beforehand in the electrode, which are plugged or filled by the spacer parts as shown in FIGS. 1 and 2. The electrode 1 could even have holes 3 stamped into it by the spacer parts 1 cut in the machine of FIGS. 5 to 7 with suitable pressure applied to drivers 12. When said spacer parts 1 are inserted into holes 3 of the electrode 2, they can advantageously be submitted to a kind of riveting action as shown in FIG. 1 in order to plug said holes 3 and be secured therein.

In FIG. 9, a thin silver sheet 35 can be seen under the magnesium sheet 33 which forms the electrode; the sheet 35 must effect an electrical contact with sheet 33 and also serve as a partition for the electrolyte in an assembled battery.

Manner of securing spacer parts to electrode surfaces has been described hereabove. It is clear that to secure the opposite faces of the spacer parts onto two sheets, it is enough to place the second sheet on said spacer parts after they have been deposited on the first and then to apply the same pressure on them and the same heating temperature on the electrode as has been previously done. This operation will be easier if the spacing sheet 31 has been covered with an adhesive tape on both faces prior to insertion into the machine of FIGS. 5–7.

In FIG. 10, the use of spacer parts 36 made according to the present invention are shown as spacing and insulating two electrodes 37 and 38 of a fuel cell 39, in which $C_t$ is the comburent and $C_e$ the fuel.

The separating spacer parts 36 have been made by the same way as the means 32. Of course, the material of the spacer parts 36 has been selected which is inert to the electrolyte 40 flowing between the electrodes 37 and 38 which are made of a porous material having the required and suitable catalytic properties.

In FIGS. 11 and 12, fuel cells 41 and 42 having cells respectively connected in parallel and series are shown. Therein, in FIG. 11, the spacer parts 43 are shown on the first-hand of insulating material, insulating two different polarity electrodes 44 and 45 and other spacer parts 46 on the second hand are of conductive material mechanically spacing and electrically connecting two adjacent-like polarity electrodes 44. Similarly, in FIG. 12, the spacer parts 47 between electrodes 48 and 49 of different polarity of the same cell are of insulating material, while spacer parts 50 are conductive.

Thus, separating or spacer parts 43 and 47 are made of an insulating material, whereas spacer parts 46 and 50 are of a conductive material.

The spacer parts 43 and 47 of insulating material are cut or punched from a sheet of such material in the machine of FIGS. 5–7 and applied to their electrodes as hereinabove described. Similarly, the conductive spacing parts 46 and 50 are cut or punched from a sheet of conductive material in the machine of FIGS. 5–7 and applied to their electrodes as hereinabove described.

In FIG. 11, the individual cells of the fuel cell 41 are shown as being parallel-connected, whereas in FIG. 12, the individual cells of a fuel cell 42 are shown as being series-connected.

In FIG. 12, the partitions 51 between individual cells are made of a metallic conductive sheet, being at the same time current collectors for such cells.

Obviously, the distribution and the size of the spacer parts 43, 46, 47 and 50 are chosen, particularly to promote the electrochemical work of their cells, the gas diffusion for comburent and fuel, the flow of electrolyte 52 or 53, the mechanical strength of the stack of the cells 41 or 42, etc.

Thus, in FIGS. 8a and 12, a staggered disposition of insulating spacer parts 47 and conductive spacer parts 50 is shown. These spacer parts 47 and 50 are secured at the same time on both facing faces of an electrode 48. This may be accomplished in the machine of FIG. 4a. In this figure, all primed reference characters denote parts corresponding to those of FIG. 4 and are located below them.

It is obvious that the sheets from which respective of the insulating and conductive spacer parts are made is not the same.

Many variations may be applied to the above description, for example, the respective spacer parts 43 and 46 could be applied, at the same time to the same electrode plates 45 or 44 by the machine of FIG. 4a. The depths of the respective spacer parts 54 and 55 applied to an electrode 56 (see FIG. 3a) can be different in various areas thereof; such a disposition could be of interest, for example, for the magnesium electrodes of a deferred action sea-water battery, the areas near rims of the said electrodes being covered with higher spacer parts than those in the middle areas, in order to readily position the positive electrode which is not as large as the negative one at its correct location. In such event, the spacer parts deposited on the rim areas will not be cut off or punched from the same sheet as that from which spacers deposited in middle areas are cut off or punched, and they will form a sort of frame for the positive electrode. At the same time, they could serve to effect tightness or sealing between the circular rims of the electrodes, said tightness presently being realized now by use of a setting resin.

The process can be semi-continuous in order to operate with large surface plates. The drivers or rivet punches 12 cut and punch a first series of spacer parts and return to allow the electrode 6a or the like and spacer sheet 31 or the like to advance, and the sequential operation of the machine as shown in FIGS. 5–7, goes on and on. Therefore, this process can be made fully automatic and can be used to operate on very long electrodes such as band-shaped electrodes and continuous sheets of spacer material, said band and sheets being advanced cyclically after each severance and deposition of spacer parts on a particular area of the electrode band.

Although specific embodiments of the invention have been described and shown, variations in practice within the scope of the appended claims are possible and are contemplated. There is no intention, therefore, of limitation to the exact disclosure herein presented.

What is claimed is:

1. A method for effecting substantially uniform spacing between electrode plates of plates of cells of a battery comprising the steps of providing a sheet of spacing material coated on one face with an adhesive that becomes tacky when heated, inserting the adhesive bearing sheet into a cooled punching out device with the adhesive of the sheet maintained in non-tacky state by such cooling facing away from the punches, positioning a sheet of electrode material directly facing the adhesive in non-tacky state bearing face of said first-named sheet, cutting out separate spacer elements from such first-named sheet with said device in any selected pattern and pushing the punched out spacer elements immediately after being cut out with their adhesive in non-tacky state bearing faces directly onto said electrode sheet while heating the latter to render the non-tacky adhesive of said spacer elements tacky, and thereby directly and positively depositing and pressing the punched out spacer elements onto said electrode sheet to which they then become adhered by the tackiness of the now heated adhesive pressed onto said heated electrode sheet, maintaining heating and pressure to effect permanent adhesion of the spacer elements to said electrode sheet, and subsequently superposing a second electrode plate over the spacer element bearing face of the first electrode sheet.

2. The method of claim 1, wherein said sheet of spacing material and the individual spacer elements are nonconductive.

3. The method of claim 1, wherein some of the spacer elements have cylindrical shape and others have a different shape.

4. The method of claim 1, wherein the adhesion is effected by a polymerizable adhesive polymerized by heat after deposition of said spacer elements on said plate.

5. The method of claim 1, wherein the spacer bearing electrode plate is a negative electrode and the second electrode plate is a positive electrode to form an electric cell upon adding electrolyte.

6. The method of claim 5, wherein said negative electrode comprises magnesium, and the positive electrode comprises a chloride selected from the group consisting of silver chloride and cuprous-chloride.

7. The method of claim 1, wherein said sheet of spacing material and the separate spacer elements are insulative.

8. The method of claim 1 including the step of stacking a plurality of said cells with the adjoining electrodes of adjacent cells having opposite polarity and interposing a conductive, non-permeable sheet between said adjoining electrodes which prevents intermingling of electrolyte of the individual cells in the stack.

9. The method of claim 8, wherein said non-permeable sheet is silver.

References Cited

UNITED STATES PATENTS

| 1,995,076 | 3/1935 | Perryman | 156—252 |
| 3,015,884 | 1/1962 | Chamberlain | 29—432 |
| 3,180,009 | 4/1965 | Lenz | 29—432 |
| 3,129,118 | 4/1964 | Wilke et al. | 136—100 |
| 3,156,586 | 11/1964 | Solomon et al. | 136—100 |
| 3,228,803 | 1/1966 | Little | 136—145 |
| 3,275,478 | 9/1966 | Rosser et al. | 136—148 |
| 3,282,734 | 11/1966 | Rzewinski | 136—86 |
| 3,306,775 | 2/1967 | Burant et al. | 136—90 |

WINSTON A. DOUGLAS, Primary Examiner

O. F. CRUTCHFIELD, Assistant Examiner

U.S. Cl. X.R.

29—400; 136—6, 86, 148, 176; 156—262